United States Patent
Tzeng et al.

(10) Patent No.: US 6,903,537 B2
(45) Date of Patent: Jun. 7, 2005

(54) SWITCHING DC-TO-DC CONVERTER WITH MULTIPLE OUTPUT VOLTAGES

(75) Inventors: Guang-Nan Tzeng, Hsin-Chu (TW); Tien-Tzu Chen, Taipei (TW); Chi-Yang Chen, Hsinchu (JP)

(73) Assignee: Aimtron Technology Corp., Hsinchu (TW)

( * ) Notice: Subject to any disclaimer, the term of this patent is extended or adjusted under 35 U.S.C. 154(b) by 0 days.

(21) Appl. No.: 10/605,721

(22) Filed: Oct. 22, 2003

(65) Prior Publication Data

US 2005/0088151 A1 Apr. 28, 2005

(51) Int. Cl.$^7$ .................................................. G05F 1/40
(52) U.S. Cl. ........................................................ 323/268
(58) Field of Search .............................. 323/267, 268, 323/269, 282; 307/29, 33, 58, 82

(56) References Cited

U.S. PATENT DOCUMENTS

| | | | |
|---|---|---|---|
| 5,610,452 A | * | 3/1997 | Shimer et al. ................. 307/89 |
| 5,959,441 A | | 9/1999 | Brown |
| 5,982,645 A | * | 11/1999 | Levran et al. ................. 363/37 |
| 6,025,706 A | | 2/2000 | Takimoto |
| 6,137,274 A | | 10/2000 | Rajagopalan |
| 6,144,194 A | | 11/2000 | Varga |
| 6,204,649 B1 | * | 3/2001 | Roman ........................ 323/282 |
| 6,246,222 B1 | | 6/2001 | Nilles |
| 6,459,602 B1 | | 10/2002 | Lipcsei |
| 2004/0113495 A1 | * | 6/2004 | Matsuo et al. ................ 307/29 |

OTHER PUBLICATIONS

The UCC38C42 Family of High–Speed, BICMOS Current Mode PWM Controllers Application Note, Feb. 2002, pp. 1–19, Texas Instruments Incorporated, Dallas, Texas.
LM555 Timer, National Semiconductor, Feb. 2000, pp. 1–12, National Semiconductor Corporation, U.S.A.

* cited by examiner

Primary Examiner—Adolf Berhane
(74) Attorney, Agent, or Firm—Winston Hsu

(57) ABSTRACT

A switching DC-to-DC converter includes multiple power supply channels, coupled in parallel between a DC voltage source and ground, for converting the DC voltage source into multiple DC output voltages that are separate from each other. An oscillator outputs multiple oscillating signals to render each of the multiple power supply channels make at least one switching transition differently in the time domain from others of the multiple power supply channels, thereby improving transient noise. The multiple oscillating signals include two triangular wave signals with a phase difference of 180 degrees and two pulse wave signals with a-phase difference of 180 degrees. Rising edges of the two pulse wave signals occur simultaneously with either a peak or a valley of the two triangular wave signals, respectively.

32 Claims, 7 Drawing Sheets

SWITCHING DC-TO-DC CONVERTER WITH MULTIPLE OUTPUT VOLTAGES

BACKGROUND OF INVENTION

1. Field of the Invention

The present invention relates to a switching DC-to-DC converter and, More particularly, to a switching DC-to-DC converter provided with multiple power supply channels for supplying multiple output voltages, capable of improving transient noise caused by power switch transistors, in which the multiple power supply channels may all adopt voltage mode feedback control, or some of them adopt voltage mode feedback control and others adopt current mode feedback control.

2. Description of the Related Art

Typically, a switching DC-to-DC converter regulates a DC voltage source for supplying a DC output voltage with a desired voltage level by appropriately controlling a duty cycle of a power switch transistor. Where the DC output voltage is larger than the DC voltage source, the switching DC-to-DC converter is generally referred to as a boost converter or regulator. On the other hand, the switching DC-to-DC converter is generally referred to as a buck converter or regulator where the DC output voltage is smaller than the DC voltage source. In order to ensure the stability of the DC output voltage, the switching DC-to-DC converter is usually provided with a feedback circuit, which may be classified as either a voltage mode feedback or a current mode feedback. In regarding to the voltage mode feedback, the feedback circuit retrieves a certain ratio of the DC output voltage for generating a feedback signal. In regarding to the current mode feedback, the feedback circuit generates a feedback signal by using a current sense amplifier to detect an inductor current. Also, the current mode feedback circuit may further retrieve a certain ratio of the DC output voltage in order to perform slope compensation.

Many of today's electronic system products effectively perform systematic operations and provide desired results by combining a variety of functional modules. For example, a digital camera is made up of a liquid crystal display, a backlight module, an image sensor, a digital signal processor, and a memory, thereby achieving the display, capture, and storage of digital images. In this case, each of the liquid crystal display, backlight module, image sensor, digital signal processor, and memory needs a DC power supply for executing the respectively designated operation and function. Typically, the functional modules incorporated in one electronic system product adopt different DC power supplies, respectively. That is, they are designed to operate with different DC power supply voltages. Since the electronic system product usually has only one DC voltage source such as a battery, a plurality of switching DC-to-DC converters are necessary to provide a plurality of different DC output voltages. As a conventional practice, the plurality of switching DC-to-DC converters are integrally manufactured in a single semiconductor integrated circuit chip for avoiding unnecessary packaging and wiring processes, thereby achieving advantages of low cost and small size as well as reducing parasitic capacitances and inductances. In this case, the plurality of switching DC-to-DC converters are formed as multiple power supply channels of the single semiconductor integrated circuit chip, which are connected in parallel between a common DC voltage source and ground and have respective output terminals for providing a plurality of different DC output voltages.

FIG. 1(a) is a circuit block diagram showing a conventional switching DC-to-DC converter 10 with multiple output voltages. Referring to FIG. 1(a), the switching DC-to-DC converter 10 has four power supply channels 11A to 11D for converting a single DC voltage source $V_{source}$, shown in FIG. 1(b), into four DC output voltages $V_{out1}$ to $V_{out4}$, respectively. The power supply channel 11A includes a switching controller 12A, a converting circuit 13A provided with a power switch transistor 15A, and a feedback circuit 14A. The power switch transistor 15A is driven by a pulse-width-modulated (PWM) control signal PWM1 output from the switching controller 12A. The PWM control signal PWM1 uses its duty cycle to determine the voltage level converting relationship between the DC voltage source $V_{source}$ and the DC output voltage $V_{out1}$. In other words, under a condition that the DC voltage source $V_{source}$ is fixed, the voltage level of the DC output voltage $V_{out1}$ can be manipulated by appropriately adjusting the duty cycle of the PWM control signal PWM1. In additional, the switching controller 12A adjusts the duty cycle of the PWM control signal PWM1 after receiving a feedback signal FB1 generated by the feedback circuit 14A in order to maintain the DC output voltage $V_{out1}$ stable.

The power supply channel 11B includes a switching controller 12B, a converting circuit 13B provided with a power switch transistor 15B, and a feedback circuit 14B. The power switch transistor 15B is driven by a PWM control signal PWM2 output from the switching controller 12B. The PWM control signal PWM2 uses its duty cycle to determine the voltage level converting relationship between the DC voltage source $V_{source}$ and the DC output voltage $V_{out2}$. The switching controller 12B adjusts the duty cycle of the PWM control signal PWM2 after receiving a feedback signal FB2 generated by the feedback circuit 14B in order to maintain the DC output voltage $V_{out2}$ stable. The power supply channel 11C includes a switching controller 12C, a converting circuit 13C provided with a power switch transistor 15C, and a feedback circuit 14C. The power switch transistor 15C is driven by a PWM control signal PWM3 output from the switching controller 12C. The PWM control signal PWM3 uses its duty cycle to determine the voltage level converting relationship between the DC voltage source $V_{source}$ and the DC output voltage $V_{out3}$. The switching controller 12C adjusts the duty cycle of the PWM control signal PWM3 after receiving a feedback signal FB3 generated by the feedback circuit 14C in order to maintain the DC output voltage $V_{out3}$ stable. The power supply channel 11D includes a switching controller 12D, a converting circuit 13D provided with a power switch transistor 15D, and a feedback circuit 14D. The power switch transistor 15D. is driven by a PWM control signal PWM4 output from the switching controller 12D. The PWM control signal PWM4 uses its duty cycle to determine the voltage level converting relationship between the DC voltage source $V_{source}$ and the DC output voltage $V_{out4}$. The switching controller 12D adjusts the duty cycle of the PWM control signal PWM4 after receiving a feedback signal FB4 generated by the feedback circuit 14D in order to maintain the DC output voltage $V_{out4}$ stable.

An oscillator 16 outputs a pulse signal PULSE1 and a ramp signal RAMP1 to the switching controller 12A. Rising edges of the pulse signal PULSE1 occur simultaneously with falling edges of the ramp signal RAMP1. The pulse signal PULSE1 sets the switching controller 12A to generate the rising edge of the PWM control signal PWM1, which is then used for turning on the power switch transistor 15A. The ramp signal RAMP1 and the feedback signal FB1 determine the occurrence of the falling edge of the PWM control signal PWM1, which is then used for turning off the power switch transistor 15A. The oscillator 16 further outputs a pulse signal PULSE2 and a ramp signal RAMP2 to the switching controller 12B. Rising edges of the pulse signal PULSE2 occur simultaneously with falling edges of the ramp signal RAMP2. The pulse signal PULSE2 sets the switching controller 12B to generate the rising edge of the PWM control signal PWM2, which is then used for turning on the power switch transistor 15B. The ramp signal RAMP2 and the feedback signal FB2 determine the occurrence of the falling edge of the PWM control signal PWM2, which is then used for turning off the power switch transistor 15B. The oscillator 16 still further outputs a pulse signal PULSE3 and a ramp signal RAMP3 to the switching controller 12C. Rising edges of the pulse signal PULSE3 occur simultaneously with falling edges of the ramp signal RAMP3. The pulse signal PULSE3 sets the switching controller 12C to generate the rising edge of the PWM control signal PWM3, which is then used for turning on the power switch transistor 15C. The ramp signal RAMP3 and the feedback signal FB3 determine the occurrence of the falling edge of the PWM control signal PWM3, which is then used for turning off the power switch transistor 15C. The oscillator 16 still further outputs a pulse signal PULSE4 and a ramp signal RAMP4 to the switching controller 12D. Rising edges of the pulse signal PULSE4 occur simultaneously with falling edges of the ramp signal RAMP4. The pulse signal PULSE4 sets the switching controller 12D to generate the rising edge of the PWM control signal PWM4, which is then used for turning on the power switch transistor 15D. The ramp signal RAMP4 and the feedback signal FB4 determine the occurrence of the falling edge of the PWM control signal PWM4, which is then used for turning off the power switch transistor 15D.

Referring to FIG. 1(b), the power supply channels 11A to 11D are connected in parallel between the DC voltage source $V_{source}$ and ground. More specifically, through bonding wires, the power supply channels 11A to 11D are connected in parallel between the DC voltage source $V_{souce}$ and ground. As a result, a plurality of parasitic inductances $L_w$ caused by the bonding wires exist between the DC voltage source $V_{source}$ and the power supply channels 11A to 11D. Similarly, a plurality of parasitic inductances $L_w$ caused by the bonding wires exist between the power supply channels 11A to 11D and ground. In the operation of the power supply channels 11A to 11D, the power switch transistors 15A to 15D of the converting circuits 13A to 13D are so periodically switched as to achieve the voltage converting functions. Due to the existence of the parasitic inductances $L_w$, noise is caused by a transient spike generated each time when any of the power switch transistors 15A to 15D makes a switching transition.

FIG. 1(c) is a waveform timing chart showing the pulse signals PULSE1 to PULSE4 and the ramp signals RAMP1 to RAMP4 generated by the conventional oscillator 16. As shown in FIG. 1(c), the pulse signals PULSE1 to PULSE4 are identical in waveform and in phase while the ramp signals RAMP1 to RAMP4 are identical in waveform and in phase. For this reason, what the oscillator 16 actually does is to generate a single pulse signal and a single ramp signal for simultaneously supplying to the switching controllers 12A to 12D of the power supply channels 11A to 11D. In the prior art, the oscillator 16 may have a simpler configuration with benefits of small size and low cost. However, the in-phase pulse signals PULSE1 to PULSE4 set the switching controllers 12A to 12D such simultaneously that the power switch transistors 15A to 15B then make switching transitions at the same time. As a result, the transient spikes caused by all of the power switch transistors 15A to 15B superpose together. Therefore, there is significantly large transient noise between the DC voltage source $V_{source}$ and ground, deteriorating qualities of the DC outsource put voltages $V_{out1}$ to $V_{out4}$ and much likely damaging the power supply channels 11A to 11D.

SUMMARY OF INVENTION

In view of the above-mentioned problem, an object of the present invention is to provide a switching DC-to-DC converter with multiple output voltages, capable of preventing the transient spikes caused by the multiple power channels from superposing, thereby achieving an operation with relatively low noise.

Another object of the present invention is to provide a switching DC-to-DC converter with multiple output voltages, which achieves advantages of small size and low cost by using an oscillator with a simpler configuration.

According to one aspect of the present invention, a switching DC-to-DC converter includes a first power supply channel coupled between a DC voltage source and ground, for converting the DC voltage source to a first DC output voltage; a second power supply channel coupled between the DC voltage source and ground, for converting the DC voltage source to a second DC output voltage which is separate from the first DC output voltage; and an oscillator for outputting a first oscillating signal having a first period to the first power supply channel and for outputting a second oscillating signal having a second period to the second power supply channel. During each period of the first period the first oscillating signal presents a peak, a valley, a rising portion gradually increasing from the valley toward the peak, and a falling portion gradually decreasing from the peak toward the valley. At least one switching transition of the first power supply channel occurs during one selected from a group consisting of the rising portion and the falling portion. During each period of the second period the second oscillating signal presents an instantly transiting edge which simultaneously occurs with one selected from a group consisting of the peak and the valley. At least one switching transition of the second power supply channel simultaneously occurs with the instantly transiting edge.

Preferably, the first oscillating signal is a triangular wave signal.

Preferably, the second oscillating signal is a pulse wave signal which presents a rising edge, a pulse width, and a falling edge during each period of the second period. The instantly transiting edge of the second oscillating signal refers to the rising edge thereof.

Preferably, the oscillator further outputs a first auxiliary signal to the second power supply channel. The first auxiliary signal is a ramp wave signal presenting a rising portion and a falling edge such that the falling edge thereof simultaneously occurs with the instantly transiting edge of the second oscillating signal.

Preferably, the switching DC-to-DC converter further includes a third power supply channel coupled between the DC voltage source and ground, for converting the DC voltage source to a third DC output voltage which is separate from the first and second DC output voltages. The oscillator further outputs a third oscillating signal having a third period to the third power supply channel. During each period of the third period the third oscillating signal presents a peak, a valley, a rising portion gradually increasing from the valley toward the peak, and a falling portion gradually decreasing from the peak toward the valley. The peak of the third oscillating signal simultaneously occurs with the valley of the first oscillating signal while the valley of the third oscillating signal simultaneously occurs with the peak of the first oscillating signal. At least one switching transition of the third power supply channel occurs during one selected from a group consisting of the rising portion and the falling portion of the third oscillating signal.

Preferably, the third oscillating signal is a signal inverted from the first oscillating signal.

Preferably, the switching DC-to-DC converter further includes a fourth power supply channel coupled between the DC voltage source and ground, for converting the DC voltage source to a fourth DC output voltage which is separate from the first and second DC output voltages. The oscillator further outputs a fourth oscillating signal having a fourth period to the fourth power supply channel. During each period of the fourth period the fourth oscillating signal presents an instantly transiting edge which simultaneously occurs with one selected from a group consisting of the peak and the valley of the first oscillating signal. The instantly transiting edge of the fourth oscillating signal occurs after a predetermined delay with respect to the instantly transiting edge of the second oscillating signal. At least one switching transition of the fourth power supply channel simultaneously occurs with the instantly transiting edge of the fourth oscillating signal.

Preferably, the predetermined delay is a half of the second period.

Preferably, the fourth oscillating signal is a pulse wave signal which presents a rising edge, a pulse width, and a falling edge during each period of the fourth period. The instantly transiting edge of the fourth oscillating signal refers to the rising edge thereof.

Preferably, the oscillator further outputs a second auxiliary signal to the fourth power supply channel. The second auxiliary signal is a ramp wave signal presenting a rising portion and a falling edge such that the falling edge thereof simultaneously occurs with the instantly transiting edge of the fourth oscillating signal.

According to another aspect of the invention, aswitching DC-to-DC converter includes a plurality of power supply channels connected in parallel between a DC voltage source and ground; an oscillating signal generator; and an auxiliary signal generator.

The oscillating signal generator includes an oscillating output node coupled to a first power supply channel of the plurality of power supply channels; a peak comparator having a non-inverting terminal and an inverting terminal, the non-inverting terminal being coupled to a peak setting voltage and the inverting terminal being coupled to the oscillating output node; a valley comparator having an inverting terminal and a non-inverting terminal, the inverting terminal being coupled to a valley setting voltage and the non-inverting terminal being coupled to the oscillating output node; a latch having asetting input and a resetting input, the setting input being coupled to an output terminal of the peak comparator and the resetting input being coupled to an output terminal of the valley comparator; a first inverter having an input terminal coupled to a normal output of the latch; a first switching means controlled by the first inverter; a first current source for supplying a first current from the DC voltage source to the oscillating output node; a second current source, controlled by the first switching means, for flowing a second current from the oscillating output node to the ground; and a first output capacitor coupled between the oscillating output node and ground.

The auxiliary signal generator includes an auxiliary output node coupled to a second power supply channel of the plurality of power supply channels; a sample-and-hold amplifier, controlled by the oscillating signal generator, having a non-inverting terminal and an inverting terminal, the non-inverting terminal being coupled to a reference voltage and the inverting terminal being coupled to the auxiliary output node; a sample-and-hold capacitor coupled between an output terminal of the sample-and-hold amplifier and ground; a voltage-to-current converter having a voltage input terminal and a current output terminal, the voltage input terminal being coupled to the output terminal of the sample-and-hold amplifier and the current output terminal being coupled to the auxiliary output node; a second output capacitor coupled between the auxiliary output node and ground; and a second switching means controlled by the oscillating signal generator and coupled between the auxiliary output node and ground.

Preferably, the switching Dc-to-DC converter further includes a rising edge one shot generator having an input terminal coupled to the normal output of the latch, and a falling edge one shot generator having an input terminal coupled to the normal output of the latch. The sample-and-hold amplifier is controlled by one of the rising edge and the falling edge one shot generators while the second switching means is controlled by another of the rising edge and the falling edge one shot generators.

Preferably, the switching Dc-to-DC converter further includes a second inverter having an input terminal coupled to the resetting input of the latch, and a third inverter having an input terminal coupled to the settinginput of the latch. The sample-and-hold amplifier is controlled by one of the second and the third inverters while the second switching means is controlled by another of the second and the third inverters.

Preferably, the switching Dc-to-DC converter further includes an inverting means having an input terminal and an output terminal, the input terminal being coupled to the oscillating output node and the output terminal being coupled to a third power supply channel of the plurality of power supply channels.

According to still another aspect of the invention, an oscillator includes means for outputting a first oscillating signal having a first period, and means for outputting a second oscillating signal having a second period. During each period of the first period the first oscillating signal presents a peak, a valley, a rising portion gradually increasing from the valley toward the peak, and a falling portion gradually decreasing from the peak toward the valley. During each period of the second period the second oscillating signal presents an instantly transiting edge which simultaneously occurs with one selected from a group consisting of the peak and the valley.

Perferably, the oscillator further includes means for outputting a first auxiliary signal, which is a ramp wave signal presenting a rising portion and a falling edge such that the falling edge thereof simultaneously occurs with the instantly transiting edge of the second oscillating signal.

Preferably, the oscillator further includes means for outputting a third oscillating signal having a third period. During each period of the third period the third oscillating signal presents a peak, a valley, a rising portion gradually increasing from the valley toward the peak, and a falling portion gradually decreasing from the peak toward the valley. The peak of the third oscillating signal simultaneously occurs with the valley of the first oscillating signal while the valley of the third oscillating signal simultaneously occurs with the peak of the first oscillating signal.

Preferably, the oscillator further includes means for outputting a fourth oscillating signal having a fourth period. During each period of the fourth period the fourth oscillating signal presents an instantly transiting edge which simultaneously occurs with one selected from a group consisting of the peak and the valley of the first oscillating signal. The instantly transiting edge of the fourth oscillating signal occurs after a predetermined delay with respect to the instantly transiting edge of the second oscillating signal.

Preferably, the oscillator further includes means for outputting a second auxiliary signal, which is a ramp wave signal presenting a rising portion and a falling edge such that the falling edge thereof simultaneously occurs with the instantly transiting edge of the fourth oscillating signal.

BRIEF DESCRIPTION OF DRAWINGS

The above-mentioned and other objects, features, and advantages of the present invention will become apparent with reference to the following descriptions and accompanying drawings, wherein.

DETAILED DESCRIPTION

The preferred embodiments according to the present invention will be described in detail with reference to the drawings.

For clear appreciation of features of the present invention, differences between the present invention and the prior art will be addressed before a detailed description of the preferred embodiments according to the present invention. A switching DC-to-DC converter with multiple output voltages according to the present invention is different from a multiphase or polyphase switching DC-to-DC converter disclosed in, for example, U.S. Pat. No. 5,959,441, U.S. Pat. No. 6,137,274, U.S. Pat. No. 6,144,194, and U.S. Pat. No. 6,246,222. More specifically, the prior art multiphase switching DC-to-DC converter is provided with only one output terminal for supplying a single regulated output voltage; however, the switching DC-to-DC converter according to the present invention is provided with a plurality of output terminals, which are separate from each other, for supplying a plurality of regulated output voltages. Furthermore, the prior art must work on balancing respective currents flowing through the plural power supply channels in order to prevent a harmful phenomenon called "hot channel effect." However, in the switching DC-to-DC converter according to the present invention, a plurality of power supply channels separately supply a plurality of regulated output voltages. In addition, the prior art oscillator of the multiphase switching DC-to-DC converter is restricted to generation of identical pulse signals and identical ramp signals, which may be different in phase. However, in the switching DC-to-DC converter according to the present invention, an oscillator outputs a plurality of oscillating signals with different waveforms and phases to power supply channels operated independently. Moreover, each of the power supply channels in the prior art multiphase switching DC-to-DC converter must be configured in the same feedback control mode. However, in the switching DC-to-DC converter according to the present invention, each power supply channel is allowed to use a different feedback control mode.

A method of improving,transient noise of a switching DC-to-DC converter 20 with multiple output voltages according to the present invention will be described in detail with reference to FIGS. 2(a) and 2(b) and FIG. 3.

Figure 1A:
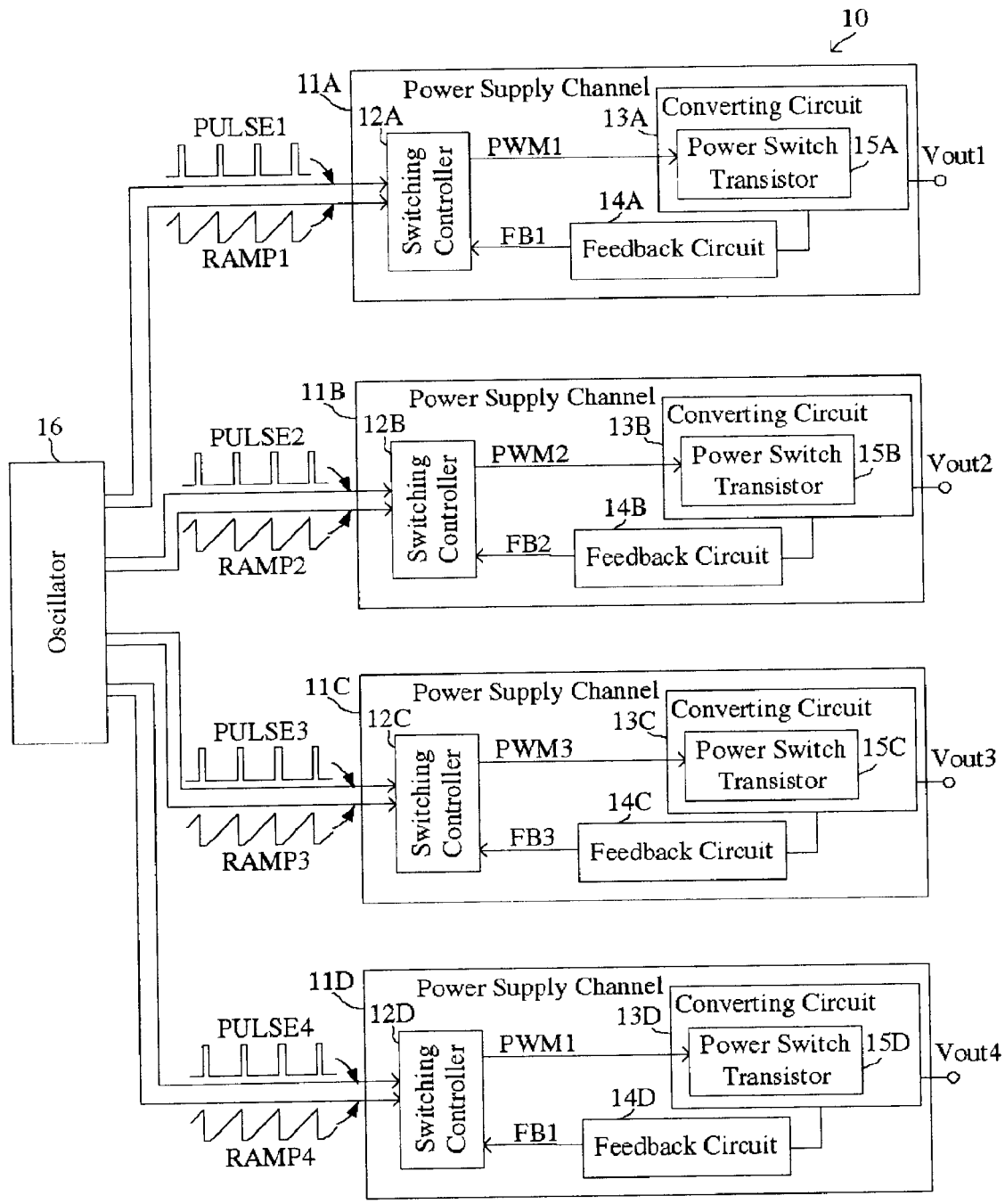
FIG. 1(a) is a circuit block diagram showing a conventional switching DC-to-DC converter with multiple output voltages.
Figure 1B:
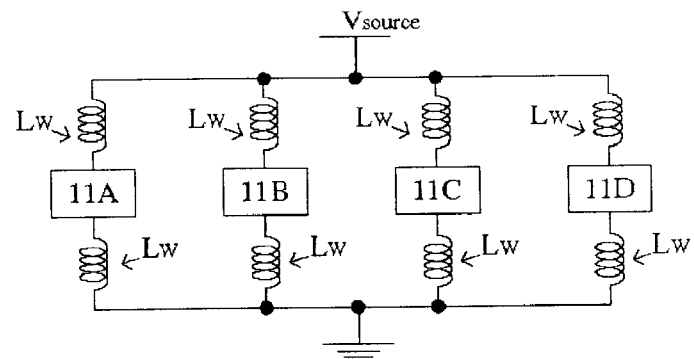
FIG. 1(b) is a diagram showing parasitic inductances caused by bonding wires between a DC voltage source and ground.
Figure 1C:
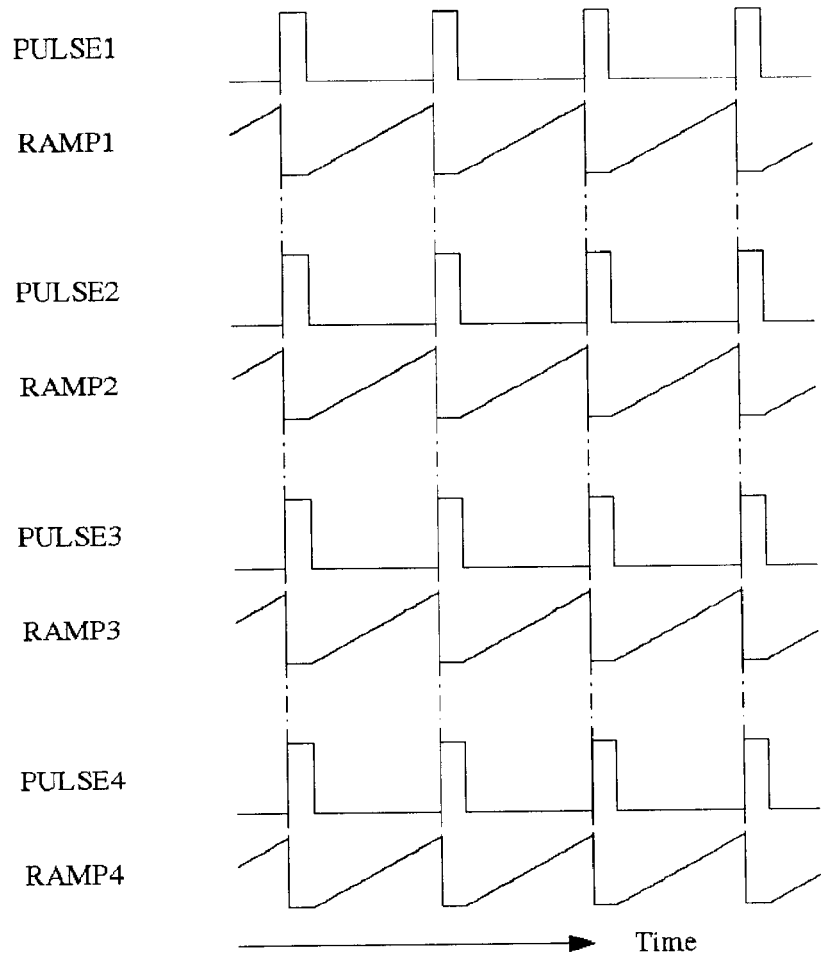
FIG. 1(c) is a waveform timing chart showing signals generated from a conventional oscillator.
Figure 2A:
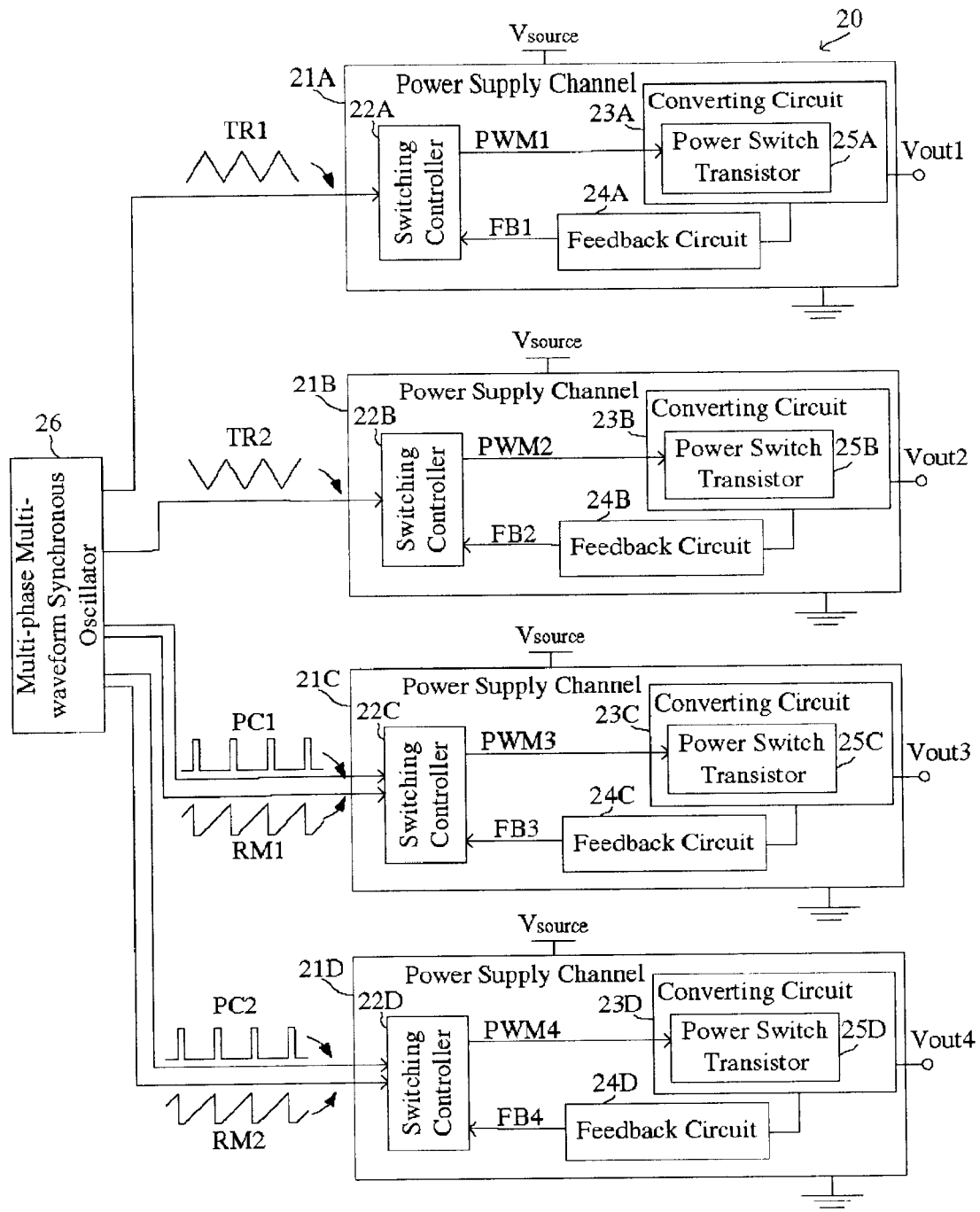
FIG. 2(a) is a circuit block diagram showing a switching DC-to-DC converter with multiple output voltages according to the present invention.

FIG. 2(a) is circuit block diagram showing a switching DC-to-DC converter 20 with multiple output voltages according to the present invention. For preventing the drawings from adverse complication and for promoting appreciation of features of the present invention, a switching DC-to-DC converter 20 with four output voltages $V_{out1}$ to $V_{out4}$ is shown in FIG. 2(a) and other figures as one embodiment according to the present invention. It should be noted that the present invention is not limited to this embodiment, but may be applied to a switching DC-to-DC converter with any possible number of output voltages. Hereinafter will described in detail the differences of the switching DC-to-DC converter 20 according to the present invention from the prior art shown in FIG. 1(a).

Referring to FIG. 2(a), the switching DC-to-DC converter 20 is different from the conventional switching DC-to-DC converter 10 shown in FIG. 1(a) in that the switching DC-to-DC converter 20 is provided with a multi-phase multi-waveform synchronous oscillator 26 for replacing the prior art oscillator 16. More specifically, the multi-phase multi-waveform synchronous oscillator 26 may generate a plurality of synchronous signals with different phases and waveforms. In the embodiment shown in FIG. 2(a), the multi-phase multi-waveform synchronous oscillator 26 outputs four synchronous oscillating signals TR1, TR2, PC1, and PC2, which are different in phase and in waveform, for delivering to switching controllers 22A to 22D of power supply channels 21A to 21D, respectively. In addition to the oscillating signal PC1, an auxiliary signal RM1 is cooperatively input to the switching controller 22C. In addition to the oscillating signal PC2, another auxiliary signal RM2 is cooperatively input to the switching controller 22D. Through the phase and waveform differences among the synchronous oscillating signals TR1, TR2, PC1, and PC2, the switching controllers 22A to 22D may cause power switch transistors 25A to 25D to make switching transitions at different times, thereby preventing the transient spikes from superposing together.

Figure 2B:
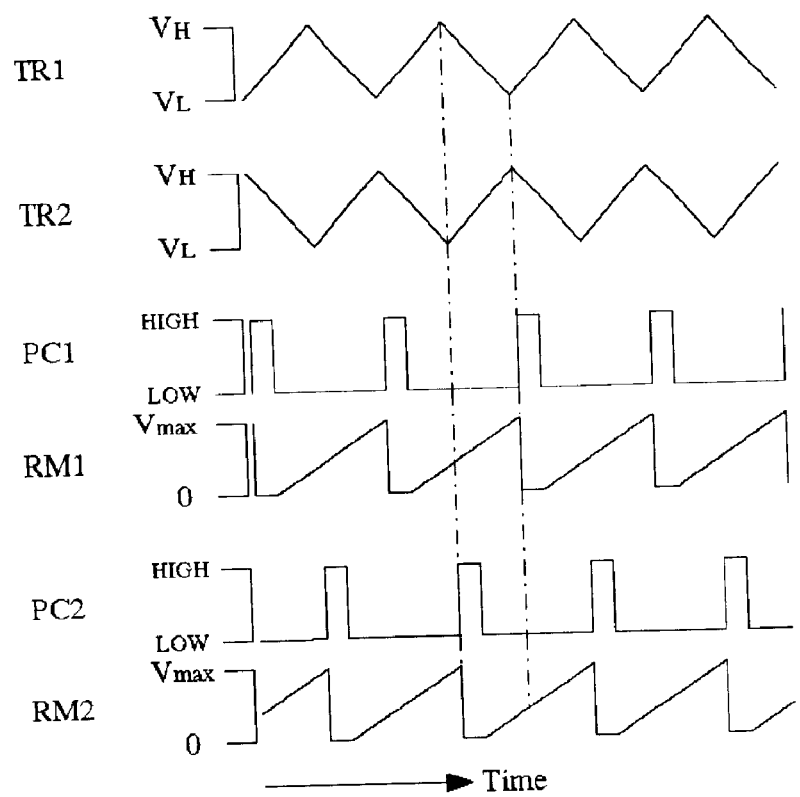
FIG. 2(b) is a waveform timing chart showing signals output by a multi-phase multi-waveform synchronous oscillator according to the present invention.

FIG. 2(b) is a waveform timing chart showing the oscillating signals TR1, TR2, PC1, and PC2 and the auxiliary signals RM1 and RM2, for clearly explaining the phase relationships and waveform features among them. Referring to FIG. 2(b), the oscillating signal TR1 is a continuous triangular wave whose amplitude varies between a peak value $V_H$ and a valley value $V_L$. Similarly, the oscillating signal TR2 is another continuous triangular wave whose amplitude also varies between the peak value $V_H$ and the valley value $V_L$. For describing the waveforms of the oscillating signals TR1 and TR2, a term "peak" refers to a part of the waveform having an amplitude of the peak value V, a term "valley" refers to a part of the waveform having an amplitude of the valley value $V_L$, a term "rising portion" refers to a part of the waveform having an amplitude gradually increasing from the valley value $V_L$ toward the peak value $V_H$, and a term "falling portion" refers to a part of the waveform having an amplitude gradually decreasing from the peak value $V_H$ toward the valley value $V_L$. The oscillating signals TR1 and TR2 have the same period but are 180 degrees out of phase with respect to each other such that the peak of the oscillating signal TR1 is aligned in the time domain to the valley of the oscillating signal TR2 while the valley of the oscillating signal TR1 is aligned in the time domain to the peak of the oscillating signal TR2. As a result, the rising portions of the oscillating signals TR1 and TR2 are staggered in time without any overlapping. Similarly, the falling portions of the oscillating signals TR1 and TR2 are staggered in time without any overlapping. It should be noted that although the oscillating signals TR1 and TR2 shown in FIG. 2(b) have the same peak value and the same valley value, the present invention is not limited to this embodiment and may be applied to another embodiment where the oscillating signals TR1 and TR2 have different peak values and different valley values. Moreover, although the oscillating signals TR1 and TR2 shown in FIG. 2(b) are equilateral triangular waves, in which the duration of time that the rising portion is present is equal to that the falling portion is present, the present invention is not limited to this embodiment and may be applied to another embodiment where the oscillating signals TR1 and TR2 are non-equilateral triangular waves, in which the duration of time that the rising portion is present is different from that the falling portion is present. Moreover, although the rising portions of the oscillating signals TR1 and TR2 shown in FIG. 2(b) are linearly increasing, the present invention is not limited to this embodiment and may be applied to another embodiment where the rising portions of the oscillating signals TR1 and TR2 are non-linearly increasing. Moreover, although the falling portions of the oscillating signals TR1 and TR2 shown in FIG. 2(b) are linearly decreasing, the present invention is not limited to this embodiment and may be applied to another embodiment where the falling portions of the oscillating signals TR1 and TR2 are nonlinearly decreasing.

The oscillating signal PC1 is a pulse signal, in which each pulse presents a rising edge instantly transiting from LOW to HIGH, a pulse width staying at HIGH, and a falling edge instantly transiting from HIGH to LOW. The auxiliary signal RM1 is a continuous ramp wave presenting, in each period, a rising portion gradually increasing from 0 to a maximum $V_{max}$ and a falling edge instantly transiting from the maximum $V_{max}$ to 0. The rising edge of the oscillating signal PC1 simultaneously occurs with the falling edge of the auxiliary signal RM1. The oscillating signal PC2 is a pulse signal, in which each pulse presents a rising edge instantly transiting from LOW to HIGH, a pulse width staying at HIGH, and a falling edge instantly transiting from HIGH to LOW. The auxiliary signal RM2 is a continuous ramp wave presenting, in each period, a rising portion gradually increasing from 0 to a maximum $V_{max}$ and a falling edge instantly transiting from the maximum $V_{max}$ to 0. The rising edge of the oscillating signal PC2 simultaneously occurs with the falling edge of the auxiliary signal RM2. In addition, as shown in FIG. 2(b), the oscillating signals PC1 and PC2 have the same period but are 180 degrees out of phase with respect to each other. It should be noted that although the oscillating signals PC1 and PC2 shown in FIG. 2(b) have the same maximum $V_{max}$, the present invention is not limited to this embodiment and may be applied to another embodiment where the oscillating signal PC1 has a different maximum from the oscillating signal PC2.

In the embodiment shown in FIG. 2(b), the peak value $V_H$ is approximately 0.8 volts while the valley value $V_L$ is approximately 0.3 volts. The oscillating signals TR1, TR2, PC1, and PC2 and the auxiliary signals RM1 and RM2 all have the same period of 1 microsecond. The pulse width of each of the oscillating signals PC1 and PC2 is approximately 100 nanoseconds. The binary state HIGH is approximately 2.2 volts while the binary state LOW is approximately 0 volt. The maximum $V_{max}$ of each of the auxiliary signals RM1 and RM2 is approximately 0.8 volts.

As clearly seen from FIG. 2(b), the valley of the oscillating signal TR1, the peak of the oscillating signal TR2, the rising edge of the oscillating signal PC1, and the falling edge of the auxiliary signal RM1 simultaneously occur with respect to each other. Furthermore, the peak of the oscillating signal TR1, the valley of the oscillating signal TR2, the rising edge of the oscillating signal PC2, and the falling edge of the auxiliary signal RM2 simultaneously occur with respect to each other.

Figure 3:
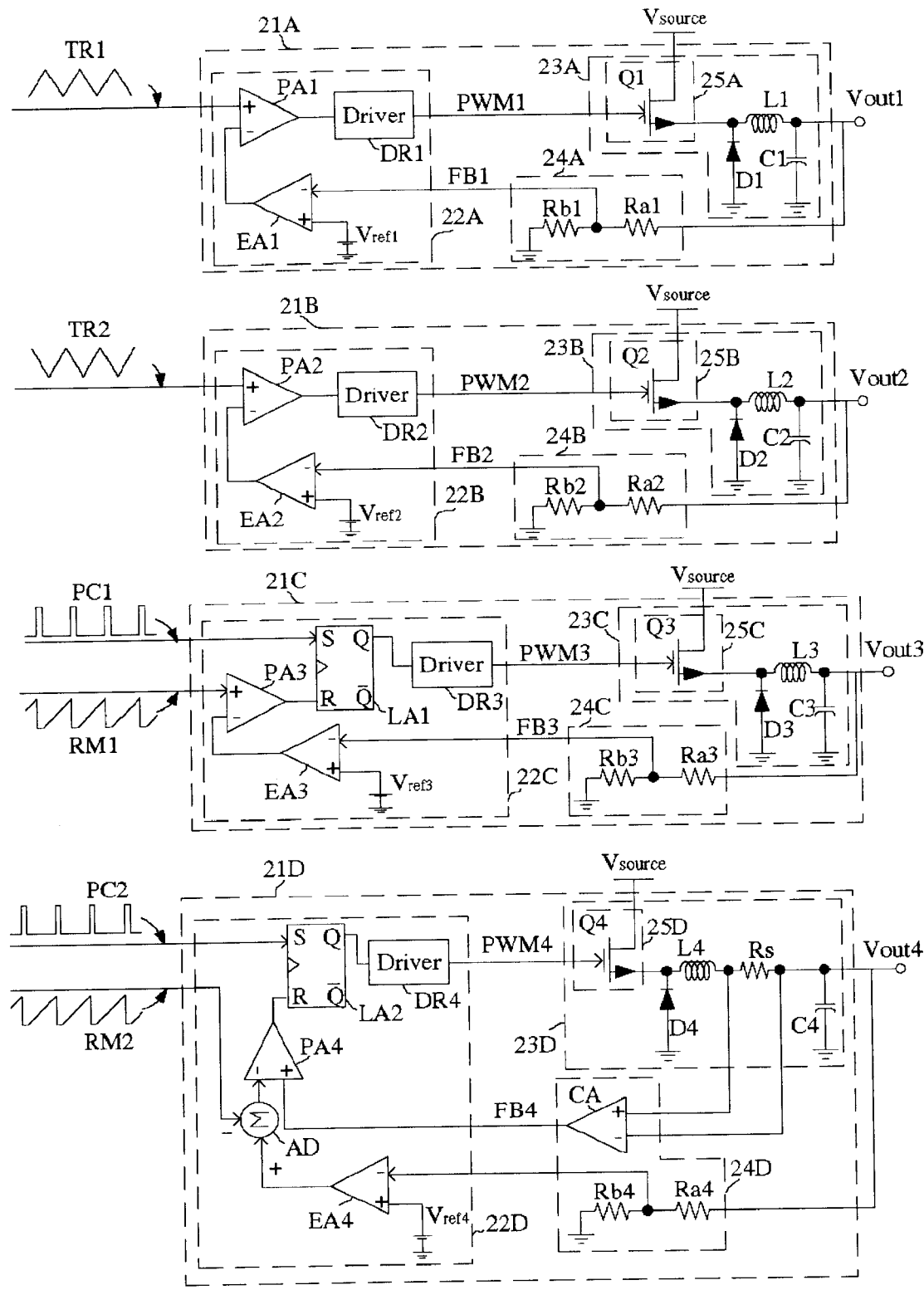
FIG. 3 is a detailed circuit diagram showing multiple power supply channels according to the present invention.

FIG. 3 is adetailed circuit diagram showing multiple power supply channels 21A to 21D according to the present: invention. Referring to FIG. 3, the power supply channel 21A adopts voltage mode feedback control and converts a DC voltage source $V_{source}$ to a DC output voltage $V_{out1}$ in response to the oscillating signal TR1. The power supply channel 21A includes a switching controller 22A, a converting circuit 23A, and a feedback circuit 24A. The converting circuit 23A is a buck type converting circuit, having a power switch transistor 25A, an inductor L1, a capacitor C1, and a diode D1, coupled together as shown. The feedback circuit 24A is a voltage divider consisting of resistors Ra1 and Rb1 for providing a feedback signal FB1 indicative of the DC output voltage $V_{out1}$. An error amplifier EA1 of the switching controller 22A compares the feedback signal FB1 with a reference voltage $V_{ref1}$. Thereafter, a PWM comparator PA1 outputs to a driver DR1 a resultant signal of the oscillating signal TR1 compared with an error voltage output from the error amplifier EA1, such that the driver DR1 generates a PWM control signal PWM1 for driving the power switch transistor 25A implemented by an NMOS transistor Q1. More specifically, at the moment when the amplitude of the oscillating signal TR1 becomes equal to the error voltage due to its gradual decrease from the peak value $V_H$, the PWM control signal PWM1 output from the driver DR1 is rendered enable, i.e. HIGH in this embodiment, under the control of the PWM comparator PA1, thereby turning on the NMOS transistor Q1. Subsequently, the PWM control signal PWM1 output from the driver DR1 is rendered disable, i.e. LOW in this embodiment, under the control of the PWM comparator PA1 at the moment when the amplitude of the oscillating signal TR1 becomes equal to the error voltage due to its gradual increase from the valley value $V_L$, thereby turning off the NMOS transistor Q1.

The power supply channel 21B adopts voltage mode feedback control and converts the DC voltage source $V_{source}$ to a DC output voltage $V_{out2}$ in response to the oscillating signal TR2. The power supply channel 21B includes a switching controller 22B, a converting circuit 23B, and a feedback circuit 24B. The converting circuit 23B is a buck type converting circuit, having a power switch transistor 25B, an inductor L2, a capacitor C2, and a diode D2, coupled together as shown. The feedback circuit 24B is a voltage divider consisting of resistors Ra2 and Rb2 for providing a feedback signal FB2 indicative of the DC output voltage $V_{out2}$. An error amplifier EA2 of the switching controller 22B compares the feedback signal FB2 with a reference voltage $V_{ref2}$. Thereafter, a PWM comparator PA2 outputs to a driver DR2 a resultant signal of the oscillating signal TR2 compared with an error voltage output from the error amplifier EA2, such that the driver DR2 generates a PWM control signal PWM2 for driving the power switch transistor 25B implemented by an NMOS transistor Q2. More specifically, at the moment when the amplitude of the oscillating signal TR2 becomes equal to the error voltage due to its gradual decrease from the peak value $V_H$, the PWM control signal PWM2 output from the driver DR2 is rendered enable, i.e. HIGH in this embodiment, under the control of the PWM comparator PA2, thereby turning on the NMOS transistor Q2. Subsequently, the PWM control signal PWM2 output from the driver DR2 is rendered disable, i.e. LOW in this embodiment, under the control of the PWM comparator PA2 at the moment when the amplitude of the oscillating signal TR2 becomes equal to the error voltage due to its gradual increase from the valley value $V_L$, thereby turning off the NMOS transistor Q2.

The power supply channel 21C adopts voltage mode feedback control and converts the DC voltage source $V_{source}$ to a DC output voltage $V_{out3}$ in response to the oscillating signal PC1 and the auxiliary signal RM1. The power supply channel 21C includes a switching controller 22C, a converting circuit 23C, and a feedback circuit 24C. The converting circuit 23C is a buck type converting circuit, having a power switch transistor 25C, an inductor L3, a capacitor C3, and a diode D3, coupled together as shown. The feedback circuit 24C is a voltage divider consisting of resistors Ra3 and Rb3 for providing a feedback signal FB3 indicative of the DC output voltage $V_{out3}$. An error amplifier EA3 of the switching controller 22C compares the feedback signal FB3 with a reference voltage $V_{ref3}$ and then outputs an error voltage to a PWM comparator PA3. More specifically, the oscillating signal PC1 sets a latch LA1 to render the PWM control signal PWM3 output from the driver DR3 enable, i.e. HIGH in this embodiment, for turning on the power switch transistor 25C implemented by an NMOS transistor Q3. On the other hand, the falling edge of the auxiliary signal RM1 occurs at the same time as the turn-on of the NMOS transistor Q3 since the falling edge of the auxiliary signal RM1 simultaneously occurs with the rising edge of the oscillating signal PC1. Subsequently, the PWM comparator PA3 resets the latch LA1 at the moment when the rising portion of the auxiliary signal RM1 gradually increases to become equal to the error voltage, such that the PWM control signal PWM3 output from the driver DR3 is rendered disable, i.e. LOW in this embodiment, thereby turning off the NMOS transistor Q3.

The power supply channel 21D adopts current mode feedback control and converts the DC voltage source $V_{source}$ to a DC output voltage $V_{out4}$ in response to the oscillating signal PC2 and the auxiliary signal RM2. The power supply channel 21D includes a switching controller 22D, a converting circuit 23D, and a feedback circuit 24D. The converting circuit 23D is a buck type converting circuit, having a power switch transistor 25D, an inductor L4, a series resistor Rs, a capacitor C4, and a diode D4, coupled together as shown. The feedback circuit 24D includes a current sense amplifier CA for providing a feedback signal FB4 indicative of a voltage difference caused by an inductor current flowing through the series resistor Rs. In order to perform the slope compensation of the current mode feedback control, the feedback circuit 24D may further include a voltage divider consisting of resistors Ra4 and Rb4 for providing a signal indicative of the DC output voltage $V_{out4}$. An error amplifier EA4 compares the signal indicative of the DC output voltage $V_{out4}$ with a reference voltage $V_{ref4}$ and then outputs an error voltage. Through an analog operational circuit AD, the error voltage minus the auxiliary signal RM2 is input to an inverting terminal of a PWM comparator PA4. The feedback signal FB4 is input to a non-inverting terminal of the PWM comparator PA4. The oscillating signal PC2 sets a latch LA2 to render the PWM control signal PWM4 output from the driver DR4 enable, i.e. HIGH in this embodiment, for turning on the power switch transistor 25D implemented by an NMOS transistor Q4. Since the falling edge of the auxiliary signal RM2 simultaneously occurs with the rising edge of the oscillating signal PC2, the falling edge of the auxiliary signal RM2 occurs at the same time as the turn-on of the NMOS transistor Q4. During the duration that the NMOS transistor Q4 is on, i.e. conductive, the inductor current flowing through the inductor L4 linearly increases, resulting in a linear increase of the feedback signal FB4 output from the current sense amplifier CA. When the feedback signal FB4 becomes equal to the voltage output from the analog operational circuit AD, the PWM comparator PA4 resets the latch LA2 to render the PWM control signal PWM4 output from the driver DR4 disable, i.e. LOW in this embodiment, thereby turning off the NMOS transistor Q4.

As clearly understood from the descriptions above, the power switch transistor 25A makes a transition from off to on during the falling portion of the oscillating signal TR1 while the power switch transistor 25B makes a transition from off to on during the falling portion of the oscillating signal TR2. Since the falling portions of the oscillating signals TR1 and TR2 are staggered in time, as shown in FIG. 2(b), the power switch transistors 25A and 25B are effectively prevented from simultaneously transiting from off to on. As a result, the transient spikes caused by the power switch transistors 25A and 25B do not superpose together.

On the other hand, the power switch transistor 25C makes a transition from off to on simultaneously with the rising edge of the oscillating signal PC1 while the power switch transistor 25D makes a transition from off to on simultaneously with the rising edge of the oscillating signal PC2. Since the rising edges of the oscillating signals PC1 and PC2 are staggered in time, as shown in FIG. 2(b), the power switch transistors 25C and 25D are effectively prevented from simultaneously transiting from off to on. As a result, the transient spikes caused by the power switch transistors 25C and 25D do not superpose together.

In addition, as clearly seen from FIG. 2(b), the rising edge of the oscillating signal PC1 locates in the time domain outside of the respective falling portions of the oscillating signals TR1 and TR2 since the rising edge of the oscillating signal PC1 simultaneously occurs with the valley of the oscillating signal TR1 and the peak of the oscillating signal TR2. As a result, the power switch transistor 25C transits from off to on at a different time from when the power switch transistors 25A and 25B respectively do. Similarly, the rising edge of the oscillating signal PC2 locates in the time domain outside of the respective falling portions of the oscillating signals TR1 and TR2 since the rising edge of the oscillating signal PC2 simultaneously occurs with the peak of the oscillating signal TR1 and the valley of the oscillating signal TR2. As a result, the power switch transistor 25D transits from off to on at a different time from when the power switch transistors 25A and 25B respectively do. Therefore, in the switching DC-to-DC converter 20 according to the present invention, the transient spikes caused by the power switch transistors 25A to 25D are effectively prevented from superposing together.

It should be noted that although, in the embodiment shown in FIG. 3, the power supply channels 21A to 21C belong to the voltage mode feedback control and the power supply channel 21D belongs to the current mode feedback control, the present invention is not limited to this embodiment and may be applied to another embodiment where all of the power supply channels 21A to 21D belong to the voltage mode feedback control or still another embodiment where the power supply channels 21A and 21B belong to the voltage mode feedback control while the power supply channels 21C and 21D belong to the current mode feedback control.

It should be noted that although, in the embodiment shown in FIG. 3, the power switch transistors 25A to 25D transit from off to on at different times with respect to each other, the present invention is not limited to this embodiment and may be applied to another embodiment where the power switch transistors 25A to 25D transit from on to off at different times with respect to each other. In other words, the power switch transistors 25A to 25D according to the present invention may make at least one switching transition at different times with respect to each other regardless of from off to on and from on to off.

Figure 4:
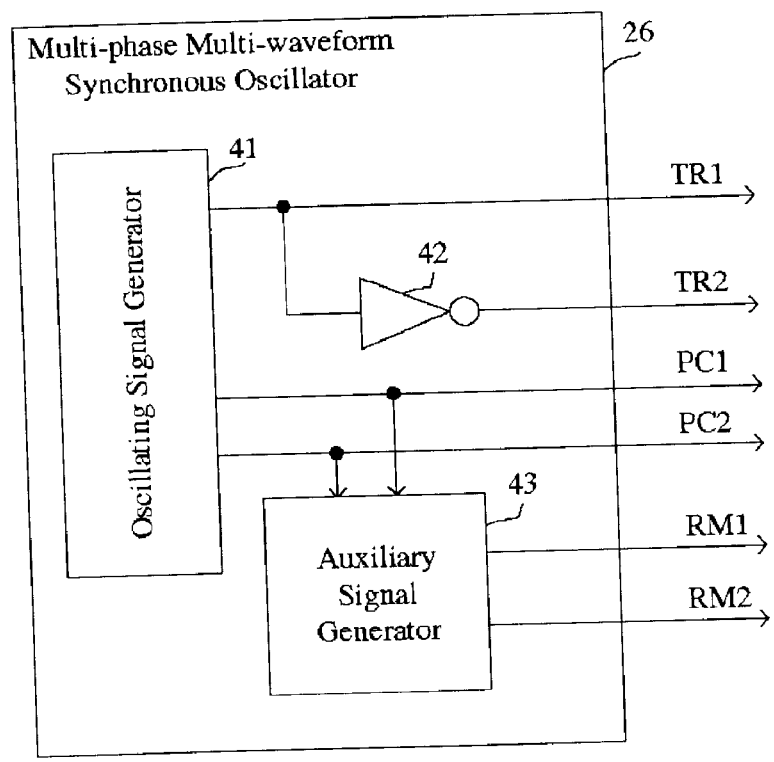
FIG. 4 is a circuit block diagram showing a multi-phase multi-waveform synchronous oscillator according to the present invention.

FIG. 4 is a circuit block diagram showing a multi-phase multi-waveform synchronous oscillator 26 according to the present invention. Referring to FIG. 4, the multi-phase multi-waveform synchronous oscillator 26 includes an oscillating signal generator 41, an inverter 42, and an auxiliary signal generator 43. More specifically, the oscillating signal 41 generates the oscillating signal TR1. Thereafter, the oscillating signal TR2 is obtained from inverting the oscillating signal TR1 through the inverter 42. As a result, the oscillating signals TR1 and TR2 are 180 degrees out of phase with respect to each other. In addition to the oscillating signal TR1, the oscillating signal generator 41 further generates the oscillating signals PC1 and PC2, which are 180 degrees out of phase with respect to each other. Finally, the auxiliary signal generator 43 outputs the auxiliary signals RM1 and RM2 in response to the oscillating signals PC1 and PC2. Hereinafter are omitted the waveform features of the oscillating signals TR1, TR2, PC1, and PC2 and the auxiliary signals RM1 and RM2 since they have been described in detail before.

Figure 5:
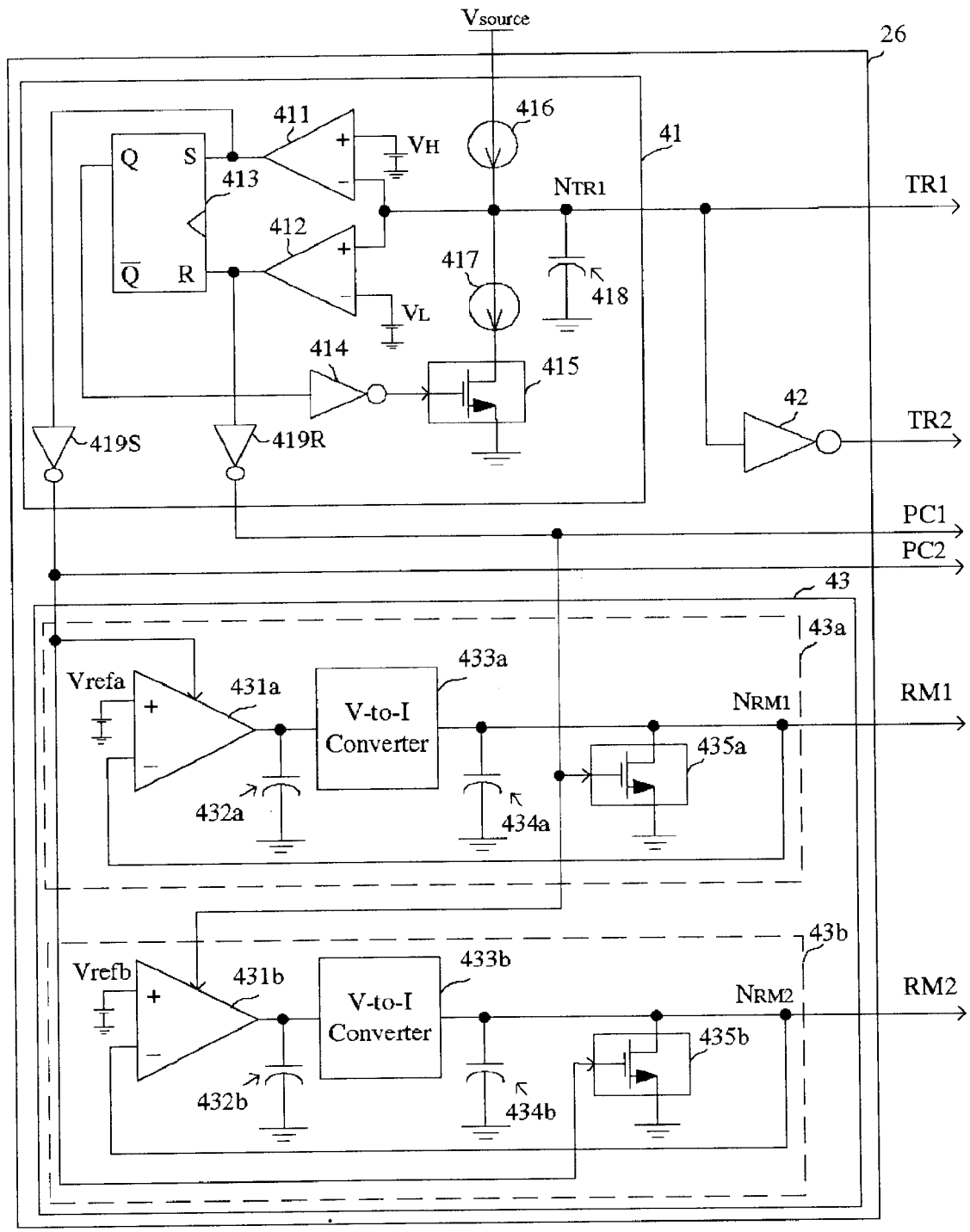
FIG. 5 is a detailed circuit diagram showing a first example of a multi-phase multi-waveform synchronous oscillator according to the present invention1.

FIG. 5 is a detailed circuit diagram showing a first example of the multi-phase multi-waveform synchronous oscillator 26 according to the present invention. Referring to FIG. 5, the oscillating signal generator 41 includes a peak comparator 411, a valley comparator 412, a latch 413, three inverters 414, 419S, and 419R, a switching means 415, a first current source 416, a second current source 417, and a capacitor 418. A non-inverting terminal of the peak comparator 411, designated by a symbol "+," is coupled to a peak setting voltage $V_H$ while an inverting terminal of the valley comparator 412, designated by a symbol "-," is coupled to a valley setting voltage $V_L$. An inverting terminal of the peak comparator 411 and a noninverting terminal of the valley comparator 412 are coupled together and further to an output node $N_{TR1}$. An output terminal of the peak comparator 411 is coupled to a setting input S of the latch 413 while an output terminal of the valley comparator 412 is coupled to a resetting input R of the latch 413. The first current source 416 is connected between the DC voltage source $V_{source}$ and the output node $N_{TR1}$ while the second current source 417 is connected between the output node $N_{TR1}$ and ground through the switching means 415. In the embodiment shown in FIG. 5, the second current source 417 supplies a current, which is twice in magnitude than that supplied by the first current source 416. In this case, the oscillating signal generator 41 generates an equilateral triangular wave whose rising portion lasts the same length of time as its failing portion does. It should be noted that the present invention is not limited to this embodiment and may be applied to any case under a condition that the second current source 417 supplies a current larger in magnitude than that supplied by the first current source 416, as described in more detail later. That is, the oscillating signal generator 41 according to the present invention may generate a non-equilateral triangular wave whose rising portion lasts a different length of time from that the falling portion does. The switching means 415 is controlled by one of the output signals from the latch 413. In the embodiment shown in FIG. 5, the switching means 415 is controlled by a normal output Q of the latch 413 through the inverter 414. It should be noted that in another embodiment of the present invention the switching means 415 may be directly coupled to an inverted output $\overline{Q}$ of the latch 413 and causes no variations to the desired control effect since the inverted output $\overline{Q}$ is essentially an inverted signal of the normal output Q. In the present invention, the switching means 415 may be implemented by a switch transistor such as an NMOS transistor, a PMOS transistor, or a bipolar transistor. The capacitor 418 connected between the output node $N_{TR1}$ and ground.

Hereinafter will be described in detail how the oscillating signal generator 41 generates the oscillating signal TR1 and the auxiliary signals PC1 and PC2 with reference to FIG. 5 and FIG. 2(b). When the voltage at the output node $N_{TR1}$ is lower than the valley setting voltage $V_L$, the setting input S is HIGH and the resetting input R is LOW, resulting in that the normal output Q is HIGH. At this moment, the inverter 414 outputs a LOW to the switching means 415 to turn it off. As a result, the second current source 417 is rendered non-conductive while the first current source 416 charges the capacitor 418 and causes the voltage at the output node $N_{TR1}$ to increase. When the voltage at the output node $N_{TR1}$ increases to become higher than the valley setting voltage $V_L$ but still lower than the peak setting voltage $V_H$, the setting input S is HIGH and the resetting input R is HIGH, resulting in that the normal output Q is HIGH. At this moment, the inverter 414 outputs a LOW to the switching means 415 to turn it off. As a result, the second current source 417 still stays non-conductive while the first current source 416 still charges the capacitor 418 and causes the voltage at the output node $N_{TR1}$ to continuously increase. When the voltage at the output node $N_{TR1}$ increases to become higher than the peak setting voltage $V_H$, the setting input S is LOW and the resetting input R is HIGH, resulting in that the normal output Q is LOW. At this moment, the inverter 414 outputs a HIGH to the switching means 415 to turn it on. As a result, the second current source 417 is rendered conductive. Because the current supplied by the second current source 417 is larger in magnitude than that supplied by the first current source 416, the capacitor 418 discharges to the ground through the second current source 417 such that the voltage at the output node $N_{TR1}$ decreases. When the voltage at the output node $N_{TR1}$ decreases to become lower than the peak setting voltage $V_H$ but still higher than the valley setting voltage $V_L$ the setting input S is HIGH and the resetting input R is HIGH, resulting in that the normal output Q is LOW. At this moment, the inverter 414 outputs a HIGH to the switching means 415 to turn it on. As a result, the second current source 417 still stays conductive and the capacitor 418 still discharges to the ground through the second current source 417 such that the voltage at the output node $N_{TR1}$ continuously decreases. In the embodiment shown in FIG. 5, the current supplied by the second current source 417 is twice in magnitude than that supplied by the first current source 416, as described above. In this case, an equilateral triangular wave is generated since the discharging current is equal in magnitude to the charging current in regard to the capacitor 418. When the voltage at the output node $N_{TR1}$ decreases to become lower than the valley setting voltage $V_L$, the oscillating signal generator 41 repeats the above-mentioned operations. Therefore, the desired oscillating signal TR1 is obtained from the output node $N_{TR1}$.

The oscillating signal PC1 is effectively obtained by inverting the resetting input R through the inverter 419R. Similarly, the oscillating signal PC2 is effectively obtained by inverting the setting input S through the inverter 419S.

Referring again to FIG. 5, the auxiliary signal generator 43 includes two ramp wave generators 43a and 43b for generating the auxiliary signals RM1 and RM2, respectively. The ramp wave generator 43a includes a sample-and-hold amplifier 431a, a sample-and-hold capacitor 432a, a voltage-to-current converter 433a, an output capacitor 434a, and a switching means 435a. The sample-and-hold amplifier 431a has a non-inverting terminal coupled to a reference voltage $V_{refa}$ and an output terminal coupled to a voltage input of the voltage-to-current converter 433a. The voltage-to-current converter 433a has a current output coupled to an output node $N_{RM1}$. The output capacitor 434a and the switching means 435a are connected in parallel between the output node $N_{RM1}$ and ground. The output node $N_{RM1}$ is further coupled to an inverting terminal of the sample-and-hold amplifier 431a for forming a closed feedback loop. On the other hand, the ramp wave generator 43b includes a sample-and-hold amplifier 431b, a sample-and-hold capacitor 432b, a voltage-to-current converter 433b, an output capacitor 434b, and a switching means 435b. The sample-and-hold amplifier 431b has a non-inverting terminal coupled to a reference voltage $V_{refb}$ and an output terminal coupled to a voltage input of the voltage-to-current converter 433b. The voltage-to-current converter 433b has a current output coupled to another output node $N_{RM2}$. The output capacitor 434b and the switching means 435b are connected in parallel between the output node $N_{RM2}$ and ground. The output node $N_{RM2}$ is further coupled to an inverting terminal of the sample-and-hold amplifier 431b for forming a closed feedback loop.

The output of the inverter 419S of the oscillating signal generator 41, i.e. the oscillating signal PC2, is adopted to control the sample-and-hold amplifier 431a and the switching means 435b. On the other hand, the output of the inverter 419R of the oscillating signal generator 41, i.e. the oscillating signal PC1, is adopted to control the sample-and-hold amplifier 431b and the switching means 435a. In the present invention, each of the switching means 435a and 435b may be implemented by a switch transistor such as an NMOS transistor, a PMOS transistor, or a bipolar transistor.

Hereinafter will be described in detail how the auxiliary signal generator 43 generates the auxiliary signals RM1 and RM2 with reference to FIG. 5 and FIG. 2(b). At first is described a method of generating the auxiliary signal RM1 by using the oscillating signals PC1 and PC2 to control the ramp wave generator 43a. When the oscillating signals PC1 and PC2 are LOW, the sample-and-hold amplifier 431a and the switching means 435a are rendered nonconductive. In this case, a fixed voltage held by the sample-and-hold capacitor 432a is converted by using the voltage-to-current converter 433a to a fixed current for charging the output capacitor 434a. As a result, the voltage at the output node $N_{RM1}$ gradually increases. When the oscillating signal PC1 is HIGH and the oscillating signal PC2 is LOW, the switching means 435a is rendered conductive. In this case, through the conductive switching means 435a, the output capacitor 434a discharges to the ground while the output node $N_{RM1}$ is connected to the ground. As a result, the voltage at the output node $N_{RM1}$ instantly decreases to the ground potential. Therefore, the desired auxiliary signal RM1 is obtained from the output node $N_{RM1}$. For enhancing the stability of the thus-obtained auxiliary signal RM1, when the oscillating signal PC1 is LOW and the oscillating signal PC2 is HIGH, the sample-and-hold amplifier 431a is rendered conductive and then compares the voltage at the output node $N_{RM1}$ with the reference voltage $V_{refa}$ through the closed feedback loop, thereby outputting an error voltage for performing the feedback control on the voltage held by the sample-and-hold capacitor 432a. Because the current for determining the rate of increase of the voltage at the output node $N_{RM1}$ is converted from the voltage held by the sample-and-hold capacitor 432a through the voltage-to-current converter 433a, the stability of the auxiliary signal RM1 obtained from the output node $N_{RM1}$ is enhanced through the feedback control. In the embodiment shown in FIG. 5 and FIG. 2(b), the reference voltage $V_{refa}$ may be selected as a half of the maximum $V_{max}$ of the auxiliary signal RM1 since the oscillating signal PC2 becomes HIGH at the half period of the auxiliary signal RM1. It should be noted that the present invention is not limited to this embodiment and the reference voltage $V_{refa}$ may be selected on the basis of the time when the oscillating signal PC2 becomes HIGH and the relationship between the feedback voltage received by the non-inverting terminal of the sample-and-hold amplifier 431a and the voltage at the output node $N_{RM1}$.

Subsequently is described a method of generating the auxiliary signal RM2 by using the oscillating signals PC1 and PC2 to control the ramp generator 43b. When the oscillating signals PC1 and PC2 are LOW, the sample-and-hold amplifier 431b and the switching means 435b are rendered non-conductive. In this case, a fixed voltage held by the sample-and-hold capacitor 432b is converted by using the voltage-to-current converter 433b to a fixed current for charging the output capacitor 434b. As a result, the voltage at the output node $N_{RM2}$ gradually increases. When the oscillating signal PC1 is LOW and the oscillating signal PC2 is HIGH, the switching means 435b is rendered conductive. In this case, through the conductive switching means 435b, the output capacitor 434b discharges to the ground while the output node $N_{RM2}$ is connected to the ground. As a result, the voltage at the output node $N_{RM2}$ instantly decreases to the ground potential. Therefore, the desired auxiliary signal RM2 is obtained from the output node $N_{RM2}$. For enhancing the stability of the thus-obtained auxiliary signal RM2, when the oscillating signal PC1 is HIGH and the oscillating signal PC2 is LOW, the sample-and-hold amplifier 431b is rendered conductive and then compares the voltage at the output node $N_{RM2}$ with the reference voltage $V_{refb}$ through the closed feedback loop, thereby outputting an error voltage for performing the feedback control on the voltage held by the sample-and-hold capacitor 432b. Because the current for determining the rate of increase of the voltage at the output node $N_{RM2}$ is converted from the voltage held by the sample-and-hold capacitor 432b through the voltage-to-current converter 433b, the stability of the auxiliary signal RM2 obtained from the output node $N_{RM2}$ is enhanced through the feedback control. In the embodiment shown in FIG. 5 and FIG. 2(b), the reference voltage $V_{refb}$ may be selected as a half of the maximum $V_{max}$ of the auxiliary signal RM2 since the oscillating signal PC1 becomes HIGH at the half period of the auxiliary signal RM2. It should be noted that the present invention is not limited to this and the reference voltage $V_{refb}$ may be selected on the basis of the time when the oscillating signal PC1 becomes HIGH and the relationship between the feedback voltage received by the non-inverting terminal of the sample-and-hold amplifier 431b and the voltage at the output node $N_{RM2}$.

Figure 6:
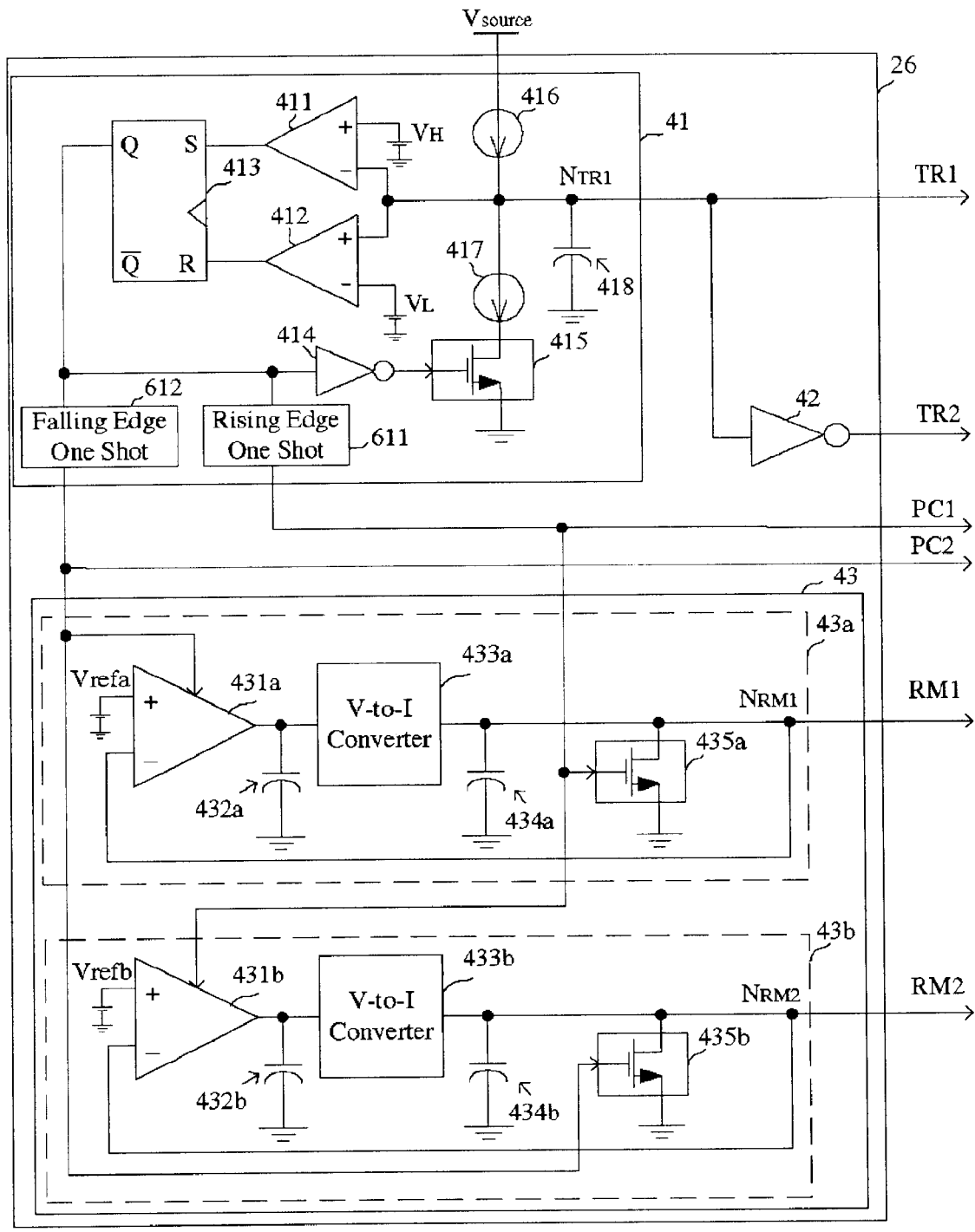
FIG. 6 is a detailed circuit diagram showing a second example of a multi-phase multi-waveform synchronous oscillator according to the present invention.

FIG. 6 is a detailed circuit diagram showing a second example of the multi-phase multi-waveform synchronous oscillator 26 according to the present invention. The second example shown in FIG. 6 is identical to the first example shown in FIG. 5 except for the circuit of generating the oscillating signals PC1 and PC2 and the method thereof. Therefore, similar elements of FIG. 6 to those of FIG. 5 are designated with the same reference numerals of FIG. 5. For the sake of simplicity, only is described in the following the differences of the second example from the first example.

As shown in FIG. 6, the second example replaces the inverters 419R and 419S of the first example shown in FIG. 5 with a first one shot generator 611 and a second one shot generator 612, respectively. More specifically, the first one shot generator 611 is a rising edge one shot generator whose input terminal is coupled to the normal output Q of the latch 413. Upon detecting a rising edge of the normal output Q, the first one shot generator 611 outputs a pulse with a predetermined width such as 100 nanoseconds. Since the rising edge of the normal output Q occurs at a time when the oscillating signal TR1 reaches the valley, the first one shot generator 611 effectively generates the desired oscillating signal PC1. On the other hand, the second one shot generator 612 is a falling edge one shot generator whose output terminal is coupled to the normal output Q of the latch 413. Upon detecting a falling edge of the normal output Q, the second one shot generator 612 outputs a pulse with a predetermined width such as 100 nanoseconds. Since the falling edge of the normal output Q occurs at a time when the oscillating signal TR1 reaches the peak, the second one shot generator 612 effectively generates the desired oscillating signal PC2.

The second example shown in FIG. 6 provides an additional advantage as described in the following. The pulses of each of the oscillating signals PC1 and PC2 have advantageously a fixed width because the oscillating signals PC1 and PC2 are generated by using the first and second one shot generators 611 and 612, respectively. Since the oscillating signals PC1 and PC2 control the switching means 435a and 435b as described above, the fixed-width pulses ensure constant each discharging period of time of the output capacitors 434a and 434b, as well as each charging period of time. As a result, the stabilities of the auxiliary signals RM1 and RM2 are further improved.

In one embodiment of the present invention, the switching controllers 22A to 22D, the feedback circuits 24A to 24D, and the multi-phase multi-waveform synchronous oscillator 26 are incorporated in a single semiconductor integrated circuit chip. The converting circuits 23A to 23D are formed as external circuits to the single semiconductor integrated circuit chip and may be implemented by buck type or boost type converting circuits depending on practical application. In another embodiment of the present invention, the power switch transistors 25A to 25D of the converting circuits 23A to 23D may also be incorporated in a single semiconductor integrated circuit chip with the switching controllers 22A to 22D, the feedback circuits 24A to 24D, and the multi-phase multi-waveform synchronous oscillator 26. In this case, the remaining portions of the converting circuits 23A to 23D are formed as external circuits.

Moreover, the multi-phase multi-waveform synchronous oscillator 26 may be independently formed as a semiconductor integrated circuit chip and then coupled through bonding wires to another semiconductor integrated circuit chip provided with the power supply channels 22A to 22D. In addition, the multi-phase multi-waveform synchronous oscillator 26 may output a plurality of oscillating signals to plurality of semiconductor integrated circuit chips, each of which is provided with one power supply channel and packaged separately.

While the invention has been described by way of examples and in term of preferred embodiments, it is to be the understood that the invention is not limited to the disclosed embodiments. To the contrary, it is intended to cover various modifications. Therefore, the scope of the appended claim should be accorded the broadest interpretation so as to encompass all such modifications.

What is claimed is:

1. A switching DC-to-DC converter, comprising:
   a first power supply channel coupled between a DC voltage source and ground, for converting the DC voltage source to a first DC output voltage;
   a second power supply channel coupled between the DC voltage source and ground, for converting the DC voltage source to a second DC output voltage which is separate from the first DC output voltage; and
   an oscillator for outputting a first oscillating signal having a first period to the first power supply channel and for outputting a second oscillating signal having a second period to the second power supply channel,
   wherein:
   during each period of the first period, the first oscillating signal presents a peak, a valley, a rising portion gradually increasing from the valley toward the peak, and a falling portion gradually decreasing from the peak toward the valley, such that at least one switching transition of the first power supply channel occurs during one selected from a group consisting of the rising portion and the falling portion; and
   during each period of the second period, the second oscillating signal presents an instantly transiting edge which simultaneously occurs with one selected from a group consisting of the peak and the valley, such that at least one switching transition of the second power supply channel simultaneously occurs with the instantly transiting edge.

2. The converter according to claim 1, wherein the first oscillating signal is a triangular wave signal.

3. The converter according to claim 1, wherein:
   the second oscillating signal is a pulse wave signal which presents a rising edge, a pulse width, and a falling edge during each period of the second period, and
   the instantly transiting edge of the second oscillating signal refers to the rising edge thereof.

4. The converter according to claim 1, wherein:
the oscillator includes:
a valley comparator for comparing the first oscillating signal with a valley setting voltage, and
an inverter having an input terminal coupled to an output terminal of the valley comparator, for generating the second oscillating signal.

5. The converter according to claim 1, wherein:
the oscillator includes:
a peak comparator for comparing the first oscillating signal with a peak setting voltage;
a valley comparator for comparing the first oscillating signal with a valley setting voltage;
a latch having a setting input and a resetting input for outputting a normal output, the setting input being coupled to an output terminal of the peak comparator and the resetting input being coupled to an output terminal of the valley comparator; and
a rising edge one shot generator for generating the second oscillating signal in response to the normal output.

6. The converter according to claim 1, wherein the oscillator further outputs a first auxiliary signal to the second power supply channel, in which the first auxiliary signal is a ramp wave signal presenting a rising portion and a falling edge such that the falling edge thereof simultaneously occurs with the instantly transiting edge of the second oscillating signal.

7. The converter according to claim 6, wherein the second power supply channel performs slop compensation of current mode feedback control by using the first auxiliary signal.

8. The converter according to claim 6, wherein:
the oscillator includes:
a peak comparator for comparing the first oscillating signal with a peak setting voltage;
a valley comparator for comparing the first oscillating signal with a valley setting voltage;
a first inverter having an input terminal coupled to an output terminal of the valley comparator, for generating the second oscillating signal;
a second inverter having an input terminal coupled to an output terminal of the peak comparator;
an auxiliary output node for outputting the first auxiliary signal;
a sample-and-hold amplifier, controlled by the second inverter, for comparing the first auxiliary signal with a reference voltage;
a sample-and-hold capacitor coupled between an output terminal of the sample-and-hold amplifier and the ground;
a voltage-to-current converter having a voltage input terminal and a current output terminal, the voltage input terminal being coupled to the output terminal of the sample-and-hold amplifier and the current output terminal being coupled to the auxiliary output node;
an output capacitor coupled between the auxiliary output node and ground; and
a switching means controlled by the first inverter and coupled between the auxiliary output node and ground.

9. The converter according to claim 8, wherein the reference voltage is a half of an amplitude maximum of the first auxiliary signal.

10. The converter according to claim 6, wherein:
the oscillator includes:
a peak comparator for comparing the first oscillating signal with a peak setting voltage;
a valley comparator for comparing the first oscillating signal with a valley setting voltage;
a latch having a setting input and a resetting input for outputting a normal output, the setting input being coupled to an output terminal of the peak comparator and the resetting input being coupled to an output terminal of the valley comparator;
a rising edge one shot generator for generating the second oscillating signal in response to the normal output;
a falling edge one shot generator for receiving the normal output;
an auxiliary output node for outputting the first auxiliary signal;
a sample-and-hold amplifier, controlled by the falling edge one shot generator, for comparing the first auxiliary signal with a reference voltage;
a sample-and-hold capacitor coupled between an output terminal of the sample-and-hold amplifier and the ground;
a voltage-to-current converter having a voltage input terminal and a current output terminal, the voltage input terminal being coupled to the output terminal of the sample-and-hold amplifier and the current output terminal being coupled to the auxiliary output node;
an output capacitor coupled between the auxiliary output node and ground; and
a switching means controlled by the rising edge one shot generator and coupled between the auxiliary output node and ground.

11. The converter according to claim 1, further comprising:
a third power supply channel coupled between the DC voltage source and ground, for converting the DC voltage source to a third DC output voltage which is separate from the first and second DC output voltages, wherein:
the oscillator further outputs a third oscillating signal having a third period to the third power supply channel;
during each period of the third period, the third oscillating signal presents a peak, a valley, a rising portion gradually increasing from the valley toward the peak, and a falling portion gradually decreasing from the peak toward the valley, such that the peak of the third oscillating signal simultaneously occurs with the valley of the first oscillating signal while the valley of the third oscillating signal simultaneously occurs with the peak of the first oscillating signal; and
at least one switching transition of the third power supply channel occurs during one selected from a group consisting of the rising portion and the falling portion of the third oscillating signal.

12. The converter according to claim 11, wherein the thirdoscillating signal is a signal inverted from the first oscillating signal.

13. The converter according to claim 1, further comprising:
a fourth power supply channel coupled between the DC voltage source and ground, for converting the DC voltage source to a fourth DC output voltage which is separate from the first and second DC output voltages, wherein:
the oscillator further outputs a fourth oscillating signal having a fourth period to the fourth power supply channel;

during each period of the fourth period, the fourth oscillating signal presents an instantly transiting edge which simultaneously occurs with one selected from a group consisting of the peak and the valley of the first oscillating signal;

the instantly transiting edge of the fourth oscillating signal occurs after a predetermined delay with respect to the instantly transiting edge of the second oscillating signal; and at least one switching transition of the fourth power supply channel simultaneously occurs with the instantly transiting edge of the fourth oscillating signal.

14. The converter according to claim 13, wherein the predetermined delay is a half of the second period.

15. The converter according to claim 13, wherein:

the fourth oscillating signal is a pulse wave signal which presents a rising edge, a pulse width, and a falling edge during each period of the fourth period, and the instantly transiting edge of the fourth oscillating signal refers to the rising edge thereof.

16. The converter according to claim 13, wherein the oscillator further outputs a second auxiliary signal to the fourth power supply channel, in which the second auxiliary signal is a ramp wave signal presenting a rising portion and a falling edge such that the falling edge thereof simultaneously occurs with the instantly transiting edge of the fourth oscillating signal.

17. The converter according to claim 16, wherein the fourth power supply channel performs slop compensation of current mode feedback control by using the second auxiliary signal.

18. The converter according to claim 16, wherein the outputting of the second auxiliary signal from the oscillator is implemented by using the second and fourth oscillating signals.

19. The converter according to claim 16, wherein:

the oscillator includes:

an auxiliary output node for outputting the second auxiliary signal;

a sample-and-hold amplifier, controlled by the second oscillating signal, for comparing the second auxiliary signal with a reference voltage;

a sample-and-hold capacitor coupled between an output terminal of the sample-and-hold amplifier and the ground;

a voltage-to-current converter having a voltage input terminal and a current output terminal, the voltage input terminal being coupled to the output terminal of the sample-and-hold amplifier and the current output terminal being coupled to the auxiliary output node;

an output capacitor coupled between the auxiliary output node and ground; and a switching means controlled by the fourth oscillating signal and coupled between the auxiliary output node and ground.

20. A switching DC-to-DC converter, comprising:

a plurality of power supply channels connected in parallel between a DC voltage source and ground;

an oscillating signal generator, including:

an oscillating output node coupled to a first power supply channel of the plurality of power supply channels;

a peak comparator having a non-inverting terminal and an inverting terminal, the non-inverting terminal being coupled to a peak setting voltage and the inverting terminal being coupled to the oscillating output node;

a valley comparator having an inverting terminal and a non-inverting terminal, the inverting terminal being coupled to a valley setting voltage and the non-inverting terminal being coupled to the oscillating output node;

a latch having a setting input and a resetting input, the setting input being coupled to an output terminal of the peak comparator and the resetting input being coupled to an output terminal of the valley comparator;

a first inverter having an input terminal coupled to a normal output of the latch;

a first switching means controlled by the first inverter;

a first current source for supplying a first current from the DC voltage source to the oscillating output node;

a second current source, controlled by the first switching means, for flowing a second current from the oscillating output node to the ground; and a first output capacitor coupled between the oscillating output node and ground; and an auxiliary signal generator, including:

an auxiliary output node coupled to a second power supply channel of the plurality of power supply channels;

a sample-and-hold amplifier, controlled by the oscillating signal generator, having a non-inverting terminal and an inverting terminal, the non-inverting terminal being coupled to a reference voltage and the inverting terminal being coupled to the auxiliary output node;

a sample-and-hold capacitor coupled between an output terminal of the sample-and-hold amplifier and ground;

a voltage-to-current converter having a voltage input terminal and a current output terminal, the voltage input terminal being coupled to the output terminal of the sample-and-hold amplifier and the current output terminal being coupled to the auxiliary output node;

a second output capacitor coupled between the auxiliary output node and ground; and a second switching means controlled by the oscillating signal generator and coupled between the auxiliary output node and ground.

21. The converter according to claim 20, further comprising:

a rising edge one shot generator having an input terminal coupled to the normal output of the latch, and a falling edge one shot generator having an input terminal coupled to the normal output of the latch, wherein:

the sample-and-hold amplifier is controlled by one of the rising edge and the falling edge one shot generators while the second switching means is controlled by another of the rising edge and the falling edge one shot generators.

22. The converter according to claim 20, further comprising:

a second inverter having an input terminal coupled to the resetting input of the latch, and a third inverter having an input terminal coupled to the setting input of the latch, wherein:

the sample-and-hold amplifier is controlled by one of the second and the third inverters while the second switching means is controlled by another of the second and the third inverters.

23. The converter according to claim 20, further comprising:

an inverting means having an input terminal and an output terminal, the input terminal being coupled to the oscillating output node and the output terminal being coupled to a third power supply channel of the plurality of power supply channels.

24. An oscillator, comprising:

means for outputting a first oscillating signal having a first period, and means for outputting a second oscillating signal having a second period, wherein:

during each period of the first period, the first oscillating signal presents a peak, a valley, a rising portion gradually increasing from the valley toward the peak, and a falling portion gradually decreasing from the peak toward the valley, and during each period of the second period, the second oscillating signal presents an instantly transiting edge which simultaneously occurs with one selected from a group consisting of the peak and the valley.

25. The oscillator according to claim 24, wherein the first oscillating signal is a triangular wave signal.

26. The oscillator according to claim 24, wherein:

the second oscillating signal is a pulse wave signal which presents a rising edge, a pulse width, and a falling edge during each period of the second period, and the instantly transiting edge of the second oscillating signal refers to the rising edge thereof.

27. The oscillator according to claim 24, further comprising:

means for outputting a first auxiliary signal, which is a ramp wave signal presenting a rising portion and a falling edge such that the falling edge thereof simultaneously occurs with the instantly transiting edge of the second oscillating signal.

28. The oscillator according to claim 24, further comprising:

means for outputting a third oscillating signal having a third period, wherein:

during each period of the third period, the third oscillating signal presents a peak, a valley, a rising portion gradually increasing from the valley toward the peak, and a falling portion gradually decreasing from the peak toward the valley, such that the peak of the third oscillating signal simultaneously occurs with the valley of the first oscillating signal while the valley of the third oscillating signal simultaneously occurs with the peak of the first oscillating signal.

29. The oscillator according to claim 28, wherein the third oscillating signal is an inverted signal of the first oscillating signal.

30. The oscillator according to claim 24, further comprising:

means for outputting a fourth oscillating signal having a fourth period, wherein:

during each period of the fourth period, the fourth oscillating signal presents an instantly transiting edge which simultaneously occurs with one selected from a group consisting of the peak and the valley of the first oscillating signal, and the instantly transiting edge of the fourth oscillating signal occurs after a predetermined delay with respect to the instantly transiting edge of the second oscillating signal.

31. The oscillator according to claim 30, wherein:

the fourth oscillating signal is a pulse wave signal which presents a rising edge, a pulse width, and a falling edge during each period of the fourth period, and the instantly transiting edge of the fourth oscillating signal refers to the rising edge thereof.

32. The oscillator according to claim 30, further comprising:

means for outputting a second auxiliary signal, which is a ramp wave signal presenting a rising portion and a falling edge such that the falling edge there of simultaneously occurs with the instantly transiting edge of the fourth oscillating signal.

* * * * *

UNITED STATES PATENT AND TRADEMARK OFFICE
CERTIFICATE OF CORRECTION

PATENT NO. : 6,903,537 B2
DATED : June 7, 2005
INVENTOR(S) : Tzeng, Guang-Nan et al.

It is certified that error appears in the above-identified patent and that said Letters Patent is hereby corrected as shown below:

<u>Title page,</u>
Item [75], Inventors, after "Chi-Yang Chen" "Japan" should be changed to read
-- Taiwan --.

Signed and Sealed this

Sixteenth Day of August, 2005

JON W. DUDAS
*Director of the United States Patent and Trademark Office*